United States Patent Office 3,278,490
Patented Oct. 11, 1966

3,278,490
POLYCHLOROALDEHYDES AND PROCESS OF PREPARING SAME
Irving Rosen and George H. McCain, Painesville, Ohio, assignors to Diamond Alkali Company, Cleveland, Ohio, a corporation of Delaware
No Drawing. Filed Aug. 5, 1963, Ser. No. 300,094
11 Claims. (Cl. 260—67)

This invention relates to novel halogen-containing thermoplastic compositions of matter. More particularly, it relates to useful copolymers of trichloroacetaldehyde and dichloroacetaldehyde and to the method for preparing these compositions.

It has long been known that trichloroacetaldehyde monomer, commonly referred to as chloral and so designated hereinafter, may be converted to polymers of varying molecular weight by contacting this monomer, under suitable conditions, with a variety of familiar ionic polymerization catalysts such as acids, bases, peroxides and the like. The chloral polymers so prepared have been, for the most part, brittle, low molecular weight materials not useful in preparing plastic articles as they are thermally unstable, decomposing and reverting quickly to monomer when exposed in some instances to even slightly elevated temperatures. More recently Furukawa and co-workers, reporting in Makromolekulare Chemie, 44–46, pages 398 to 407, have prepared crystalline polychloral by contacting the monomer, at varied temperatures, with organometallic polymerization catalysts such as butyl lithium, zinc diethyl, cadmium dialkyl and boron trialkyl. The polychloral product so obtained is concluded by the authors to be much higher in molecular weight than previously known chloral polymers since this material exhibits much improved thermal stability characteristics by comparison to the known polymers.

Chloral polymers prepared with coordination catalysts as described above are found to be crystalline, hard and tough thermoplastic materials which possess inherently a high degree of fire retardancy because of their substantial chlorine content. These polymers are, however, highly resistant to common organic solvents and have extremely high softening points and have thus been processed heretofore with extreme difficulty by conventional techniques.

It is an object of this invention, therefore, to provide a chloral polymer composition which may be more easily processed by presently practiced fabrication techniques into useful plastic articles having a high degree of fire-retardancy.

Another object of this invention is to provide a process for preparing useful and easily processible chloral polymer compositions.

Still another object of this invention is to provide fire-retardant and chemically-resistant plastic articles of commerce from a solid, high molecular weight chloral polymer composition.

These and other objects are accomplished by copolymerizing, under substantially anhydrous conditions, a monomeric mixture comprising from about 90 to about 30 mol percent of chloral and from about 10 up to about 70 mol percent of dichloroacetaldehyde monomer, the copolymerization reaction being conducted in the presence of an anionic-type polymerization catalyst, at a temperature ranging from −78° to 0° C. and for a time sufficient to convert the said chloral-dichloroacetaldehyde monomer mixture into the desired copolymer composition.

The copolymer products obtained are fairly transparent in appearance, and are hard, granular, crystalline materials, in contrast to high molecular weight chloral homopolymers which are powders. In general, the copolymers of this invention begin to soften at about 160° C. and, with continued heating, show substantial stability up to about 270° to 280° C., thus exhibiting much improved thermal stability characteristics over previously known low molecular weight chloral or dichloroacetaldehyde homopolymers.

As determined by elemental carbon analysis, the copolymers of this invention contain, in general, from about 20 up to about 70 mol percent of dichloroacetaldehyde; that is to say from about 20 to 70 recurring units derived from this monomer are incorporated for each 100 monomeric units comprising the copolymer chain. Finished articles having the best physical properties, e.g., toughness, strength, etc. are prepared from copolymers containing from 40 to 60 mol percent of dichloroacetaldehyde, which copolymers are preferred. Since these copolymer products are found to be analogous in toughness and strength properties to well-known polymeric materials having a degree of polymerization (D.P.) of at least 500, it is believed that the copolymers of this invention likewise have a similar D.P., or greater. Accordingly, these copolymers, consisting essentially of recurring units derived fro chloral and dichloroacetaldehyde, may be represented broadly by the structure.

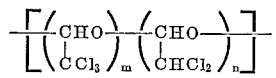

wherein $m$ is an integer ranging from at least 150 and $n$ is an integer ranging from at least 100, the sum of $m$ and $n$ being at least 500.

Of course, it will be recognized by those skilled in the art that in the copolymerization process, while the comonomers may be incorporated into the growing copolymer chain as single units, i.e., a chloral unit and a dichloroacetaldehyde unit following each other successively in the chain, the comonomers are most likely incorporated in the chain in block sequence, i.e., a number of units of one comonomer is added sequentially with no units of the other comonomer incorporated between them.

That the copolymers of this invention are of a fairly high molecular weight can be concluded from the good thermal stability evidenced by these materials and can be further substantiated by their comparative stability in hot dimethylformamide. When heated in this solvent for approximately 30 minutes at 130° C. these copolymers remain up to 50 percent stable whereas similar but lower molecular weight materials, when so heated, decompose completely in less than 10 minutes.

As stated previously, the composition of the copolymers of this invention is determined by elemental carbon analysis which is conducted on samples of the dried copolymers previously extracted with a solvent, such as chloroform, to remove therefrom any unreacted monomers or traces of low molecular weight polymers which may have formed. The carbon analyses obtained are, percentagewise, between values obtained for both chloral and dichloroacetaldehyde homopolymers The dichloroacetaldehyde content of these copolymers may then be calculated from the difference in percentage between the carbon content of the homopolymers.

The copolymerization reaction is effected, as described hereinabove, in the presence of an anionic-type polymerization catalyst. Suitable compounds of this type are organometallic compounds, e.g., diethyl zinc, diethyl cadmium, butyl lithium 9-fluorenyl lithium, combinations of 2,6-dimethoxyphenyl lithium and diethyl zinc, diethyl zinc and dibutyl zinc and the like. Also suitable are any one of these catalysts, either alone or in combination, which is further modified or complexed with no more than molar equivalent amounts of water or of lower aliphatic alcohols, e.g., ethanol. To obtain the desired copolymers in the highest possible yields, the dialkyl zinc catalysts are preferred for use.

In general, the particular catalyst employed in the process of this invention may be used in an amount ranging from about 0.03 to about 0.5 molar percent, i.e., from about 0.3 to 5 millimols for each mol of combined monomers employed. However, an amount within the range of about 0.5 to 2.0 millimols per mol of monomer usually has been found satisfactory and is preferred.

The polymerization reaction may be conducted in an inert organic liquid reaction medium which is a solvent for the monomers and is a liquid at the reaction temperature. The liquid medium which is used in up to equal volumes with respect to the combined monomers serves principally to dissipate heat generated by the reaction and also to assure the most intimate contact between the monomers and the catalyst employed. Most suitably employed are the hydrocarbon solvents in general, with the aromatic hydrocarbons, e.g., toluene, being especially preferred. Alternatively, the reaction may be conducted substantially in the absence of solvent as will be shown hereinafter by a specific example. In this type reaction, only a minute quantity of solvent is used primarily to wash down into the reactor traces of catalyst which remain on its upper walls after charging.

It has been found that trace contaminants such as water in the reaction mixture substantially inhibit preparation of the desired copolymers in good practical yield. Therefore, it is essential that the copolymerization process be conducted under anhydrous, or substantially anhydrous, conditions. For the most satisfactory copolymer products it has been established that the reaction ingredients, i.e., the monomer, or the monomer and solvent in combination, should contain less than about 50 p.p.m. of water. The monomers are advantageously dried prior to polymerization by fractional distillation and by passage of the formed monomer vapors through an absorbent such as molecular sieves. The solvent may be dehydrated by standard distillation and drying methods. Additionally, after charging the polymerization ingredients to the reactor, evacuating the reactor and then flushing it with an inert gas, the reaction is likewise carried out in an inert atmosphere by maintaining a slight positive pressure with an inert gas such as dry nitrogen, argon, helium and the like.

As described previously, the reaction generally may be conducted at a temperature ranging from $-78°$ to $0°$ C. In order to obtain the desired copolymers in the highest practical yield, the reaction temperatures of $-78°$ to about $-30°$ C. are preferably employed. In general, the reaction may be effected in a time period of from 2 to about 20 hours with reaction times of 6 to 10 hours being typical.

The chloral-dichloroacetaldehyde polymers of this invention may be employed to prepare, by conventional processing techniques, tough and durable plastic articles such as films, moldings, etc. which are transparent in appearance, are chemically resistant and possess inherently a high degree of fire retardancy. High-quality finished articles may be cut from molded sheets of these copolymers by processes such as are used in metal stamping techniques since these molded sheets are non-brittle and extremely resistant to cracking. In processing operations, these copolymers may be employed unmodified or may have incorporated therewith additives such as antioxidants, fillers, pigments, stabilizers and the like which are normally used when processing thermoplastic polymers.

In order that those skilled in the art may more completely understand the present invention and the preferred methods by which the same may be carried into effect, the following specific examples are offered.

*Example 1*

A 300-ml., three-necked, round-bottomed flask is fitted with a stirrer, a nitrogen inlet line, and a rubber-serum cap for catalyst injection. It is also fitted with a vacuum adapter to which is attached by means of a 90° connecting tube a 50-ml. flask from which the mixed monomer is charged to the polymerization flask. Nitrogen is purged through the apparatus assembly, after which 18 ml. of anhydrous toluene is charged to the flask and agitation is started. Twenty-nine hundredths ml. of a 25-percent solution of diethyl zinc catalyst in n-heptane is then injected into the polymerizer, after which the flask and its contents are cooled to $-78°$ C. by means of a dry ice-acetone cooling bath. While agitation is continued, a prechilled monomer mixture containing 17.2 ml. of chloral and 5.9 ml. of dichloroacetaldehyde (70/30 mol ratio of chloral to dichloroacetaldehyde) is then charged to the polymerization flask. After the monomer addition, the reaction mixture is maintained at $-78°$ C. for a time period of 23 hours, being agitated during this time until unfeasible due to thickening of the reaction mixture with the formed copolymer.

The reaction is terminated by the addition of 3 percent methanolic sulfuric acid to the reaction mixture. The mixture is then removed and filtered to separate the copolymer product which is washed three times with petroleum ether, four times successively with ethyl ether and is then dried under vacuum.

There is recovered 25 g. (72 percent yield) of a granular copolymer, glassy in appearance, which contains 39 mol percent of dichloroacetaldehyde, as determined by carbon elemental analysis on a portion of the product extracted with chloroform for an 8-hour period and then dried to constant weight. As determined on a Fisher-Johns melting-point apparatus, the copolymer product of this example begins to soften at about 160° C. and, with continued heating, exhibits substantial stability up to approximately 270° C. Molded specimens of the product prepared at a temperature of 300° to 400° C., under a presure of 6000 to 10,000 p.s.i., are tough and transparent, and exhibit a high degree of fire-retardancy.

*Example 2*

Employing the polymerization apparatus and following the general procedure as outlined in Example 1, a copolymer is prepared utilizing a 50/50 molar ratio of chloral to dichloroacetaldehyde monomer. Also in this example, the diethyl zinc catalyst is modified with 0.007 ml. of water (0.04 millimol of water for 1.6 millimols of catalyst per mol of monomer charge). The reaction is conducted at a temperature of $-78°$ C. for 20 hours.

After purifying and drying the copolymer product, as described in Example 1, 21.0 g. (65 percent yield) of a granular material is recovered. This product contains 48 mol percent of dichloroacetaldehyde as determined by elemental carbon analysis. It exhibits softening and processing characteristics similar to the product of Example 1.

*Examples 3-6*

These examples illustrate the use of various organometallic catalysts in preparing the chloral-dichloroacetaldehyde copolymers of this invention, employing in each example the polymerization equipment and polymerization recipe and the general procedure as outlined in Example 1. These polymerizations are all carried out for 20 hours at a temperature of $-78°$ C. in an agitated system in toluene utilizing 1.6 millimols of catalyst per mol of mixed monomers, the monomer mol charge ratio being 70/30 (chloral-dichloroacetaldehyde). Upon completion of the reaction period, the copolymer products are purified and recovered as in the previous examples, with the following results:

| Example | Catalyst | Percent Yield of Copolymer | Mol Percent of Dichloro- acetaldehyde in Polymer [1] |
|---|---|---|---|
| 3 | Ethyl zinc chloride | 25 | 49 |
| 4 | Di-n-butyl zinc | 61 | 23 |
| 5 | Di-n-hexyl zinc | 38 | 30 |
| 6 | Diphenyl zinc [2] | 56 | 25 |

[1] Determined by carbon analysis of chloroform-extracted polymer.
[2] The diphenyl zinc concentration is 13 millimols per mol of mixed monomers.

The copolymer products of these examples are similar in appearance to the products of Examples 1 and 2, and likewise exhibit similar softening, thermal stability and processing characteristics.

Example 7

A chloral-dichloroacetaldehyde copolymer is prepared substantially in the absence of solvent and with no agitation, employing the following ingredients:

| | |
|---|---|
| Chloral | 9.8 ml. (0.1 mol). |
| Dichloroacetaldehyde | 3.19 ml. (0.041 mol). |
| Diethyl zinc [1] | 0.1 ml. of a 25% solution in n-heptane. |
| Toluene | 0.5 ml. |

[1] 1.6 millimols of catalyst per mol of mixed monomer charge.

A 20 x 200 ml. test tube, having a 24/40 ground glass joint at its open end is fitted with a vacuum adapter. The adapter is fitted with a three-way stopcock valve having two tubes on one side serving as a vacuum line and a nitrogen inlet line, respectively. A 50-ml. flask from which the anhydrous combined monomer charge is added to the polymerizer is connected to the adapter. The diethyl zinc solution and the toluene are charged to the tube, and the comonomers to the flask. Both the charged tube and the flask are cooled to −78° C. under nitrogen, after which the system is evacuated to a 0.5 mm. mercury pressure and then flushed back with nitrogen. The system is then maintained under a slight positive nitrogen pressure. The cold monomer mixture is then rapidly added to the polymerization tube through the adapter, the resulting reaction mixture being thoroughly mixed together by manually shaking the polymerization tube vigorously for about 10 minutes without removing it from the cooling bath. The reaction mixture is then maintained at −78° C., under nitrogen, for 18 hours, after which the copolymer product formed is removed from the tube, leached with methanol and extracted with diethyl ether for 8 hours in a Soxhlet extractor. The extracted copolymer is dried at 30° C. under vacuum.

There is recovered 10.6 g. (55 percent yield) of a tough, translucent, granular product which contains 58 mol percent of dichloroacetaldehyde, as determined by elemental carbon analysis on the dried product. This product begins to soften at about 150° C. and shows substantial stability with continued heating up to about 200° C. The molded specimens of this copolymer are similar in appearance.

dichloroacetaldehyde. dichloroacetaldehyde complex with water diethyl zinc complex per mol of the combined of 1.6 millimols per mol of the combined each process the reaction mixture is maintained stated temperature for the listed time period, after which it is chilled to −78° C. and maintained at this temperature for the remainder of the total reaction period of 20 hours. The copolymer products are purified and recovered as in the previous examples, with the following results:

| Example | Polymer- ization Tempera- ture, °C. | Time, hrs.[1] | Percent Yield of Copolymer | Mol Percent of Dichloro- acetaldehyde in Polymer [2] |
|---|---|---|---|---|
| 8 | −60 | 6 | 67 | 48 |
| 9 | −50 | 7 | 61 | 28 |
| 10 | −40 | 6½ | 55 | 35 |

[1] Time reaction maintained at stated temperature.
[2] Determined by carbon analysis on chloroform-extracted product.

The copolymer products of these examples show stability and processing characteristics similar to the products of the previous examples.

Example 11

Employing the polymerization apparatus used in Example 1, a chloral-dichloroacetaldehyde copolymer is prepared with the following reactants:

| | |
|---|---|
| Toluene | 1.5 ml. of a 25% solution in |
| Diethyl cadmium | |

(1.6 millimols catalyst per mol of combined

| | |
|---|---|
| Chloral [1] | |
| Dichloroacetaldehyde [1] | |
| Toluene [1] | |

[1] These reactants mixed together.

The general procedure as outlined in employed. Polymerization is conducted at −78° C., being terminated after a hours. The reaction mixture is then temperature before product purification effected as described in previous examples.

Eight and one-tenth g. of a product is similar in appearance and properties of the previous examples. This mol percent of dichloroacetaldehyde mental carbon analysis of the ch

Example

In this example, a chloral-dichloroacetaldehyde copolymer is prepared at −78° C. The apparatus and the general procedure of Example 7, are employed,

| | |
|---|---|
| Chloral | |
| Dichloroacetaldehyde | |
| 2,6-dimethoxyphenyl li | |
| Diethyl zinc | |
| Toluene | |

The total polymer product is then purified dried under vacuum.

Three and one recovered which aldehyde, as d this cop prepared as in Example 12 with the exception that in this example are used 6.8 ml. of a 26.2 percent solution of butyl lithium in n-heptane and 0.35 ml. of a 25 percent solution of diethyl zinc in n-heptane. The combined catalyst concentration is 5 millimols per mole of monomers. The reaction mixture is maintained at −78° C. for 20 hours, is then removed from the polymerization tube, washed several times with methanol and dried under vacuum. The dried copolymer product is similar in appearance and properties to the products of the previous examples, being tough, hard and almost completely transparent.

It is to be understood that although the invention has been described with specific reference to particular embodiments thereof, it is not to be so limited, since changes and alterations therein may be made which are within the full intended scope of this invention as defined by the appended claims.

What is claimed is:

1. A normally solid, high molecular weight, processible thermoplastic copolymer composition having a high degree fire-retardancy comprising from about 30 up to about 80 mol percent of recurring units derived from chloral interspersed with from about 20 up to about 70 percent of recurring units derived from dichloroacetaldehyde monomer, the said copolymer composition the general structure

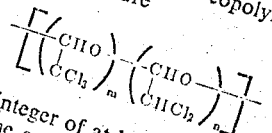

$n$ an integer of at least 150 and $n$ is an integer of 10, the sum of $m+n$ being at least 500.

2. Composition of claim 1 comprising from about 40 to 60 mol percent of the said recurring chloral units interspersed with from about 40 up to 60 percent of the said recurring dichloroacetaldehyde units.

3. Process for preparing a high molecular weight copolymer having a high degree of fire retardancy which comprises copolymerizing a mixture containing from about 10 mol percent to about 90 mol percent of chloral monomer and from about 10 mol percent to about 70 mol percent of dichloroacetaldehyde, as the sole reactants, under substantially anhydrous conditions and in the presence of a polymerization catalyst selected from the group consisting of a dialkyl zinc compound having from 2 to 12 carbon atoms, diethyl cadmium, butyl lithium, 2,6-dimethoxyphenyl lithium and mixtures thereof, and recovering a degree of polymerization of at least 500.

4. The process of claim 3 in which the catalyst is a molar equivalent of water.

5. The process of claim 4 in which the catalyst is diethyl zinc.

6. A process for preparing a high molecular weight copolymer having a high degree of fire retardancy which comprises copolymerizing under substantially anhydrous conditions at a temperature ranging between −78° and 0° C. and for a time period of from about 2 hours to about 20 hours, a mixture containing from about 30 mol to about 90 mol percent of chloral monomer and from about 10 mol percent to about 70 mol percent of dichloroacetaldehyde monomer as the sole reactants in the presence of between about 0.3 to about 5 millimoles, per mol of the combined monomers, of a polymerization catalyst selected from the group consisting of a dialkyl zinc compound selected of and complexes of said dialkyl zinc compound having a molar equivalent of water, diethyl cadmium, butyl lithium, 2,6-dimethoxyphenyl lithium and mixtures thereof up to a molar equivalent of water, and finally recovering a solid copolymer containing from about 30 to 80 mol percent of chloral and from about 20 to about 70 mol percent of dichloroacetaldehyde, said copolymer having a degree of polymerization of at least 500.

7. The process of claim 6 in which the reaction is conducted in up to an equal volume, based on the combined monomer charge, of an inert organic liquid medium which is solvent for the said monomer charge.

8. The process of claim 6 in which the catalyst is a dialkyl zinc compound.

9. The process of claim 8 in which the catalyst is diethyl zinc.

10. The process of claim 6 in which the catalyst is diethyl zinc complexed with up to a molar equivalent amount of water.

11. The process of claim 6 which is conducted at a temperature of −78° to −30° C. and for a time period of from 6 to 10 hours.

References Cited by the Examiner

FOREIGN PATENTS 659,089  3/1963  Canada.
876,956  9/1961  Great Britain.
902,602  9/1962  Great Britain.

OTHER REFERENCES

Novak et al.: Faraday Society Transactions, vol. 55, No. 441 (September 1959), pp. 1490–1499.
Novak et al.: Canadian Journal of Chemistry, vol. 37, October 1959, pp. 1722–1726.
Furukawa et al.: Die Makromolekulare Chemie, vol. 37, April 1960, pp. 149–152.
Ibid, vol. 44, March 1961, pp. 398–407, Furukawa.
Polymer—The Chemistry, Physics & Techniques of High Polymers, vol. 3, No. 3, September 1962, pp. 487–509 (pp. 495–496 relied on).

WILLIAM H. SHORT, *Primary Examiner.*

L. M. MILLER, *Assistant Examiner.*